Jan. 16, 1968 R. B. MADDOCK 3,363,816
ROLLER CONSTRUCTION FOR STRIPPING SHEET
MATERIAL FROM TRANSPORT ROLLERS
Original Filed May 1, 1963 2 Sheets-Sheet 2
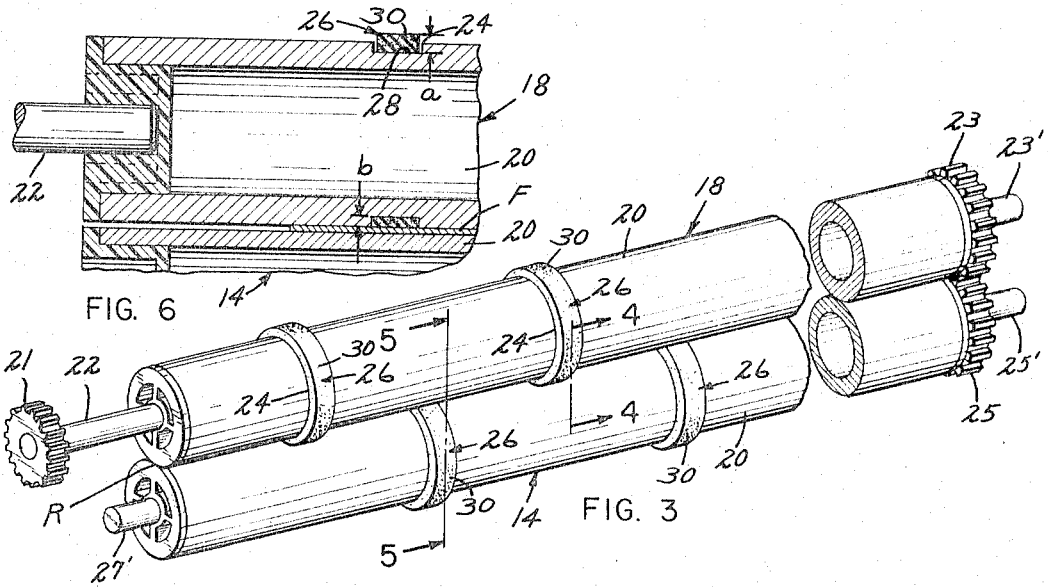
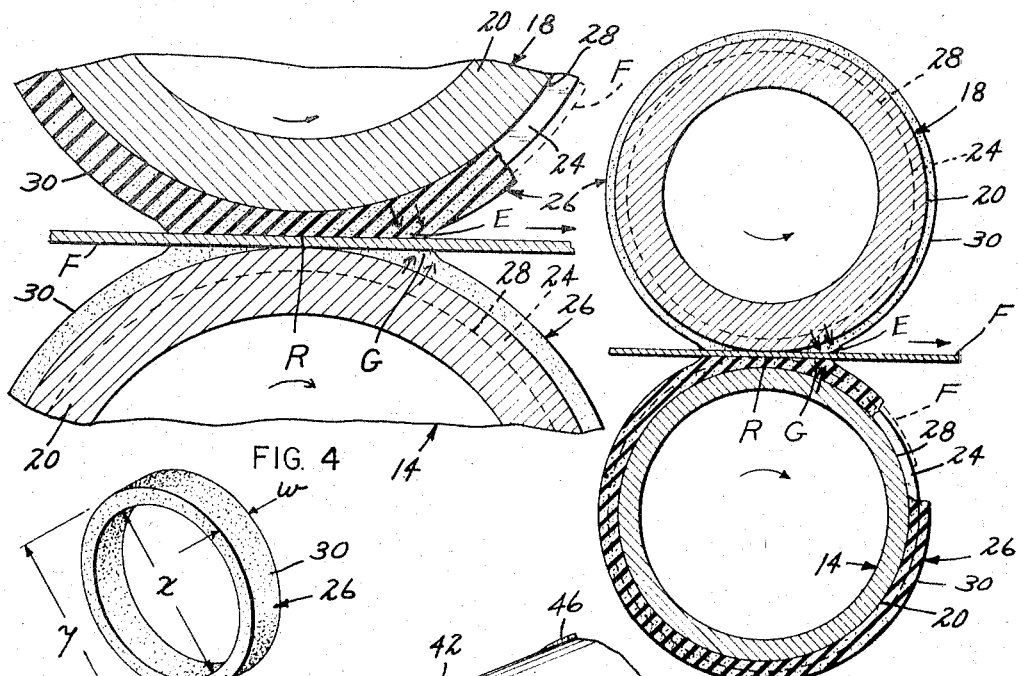
INVENTOR.
RALPH B. MADDOCK
BY
Caswell, Lagaard & Sticks
ATTORNEYS

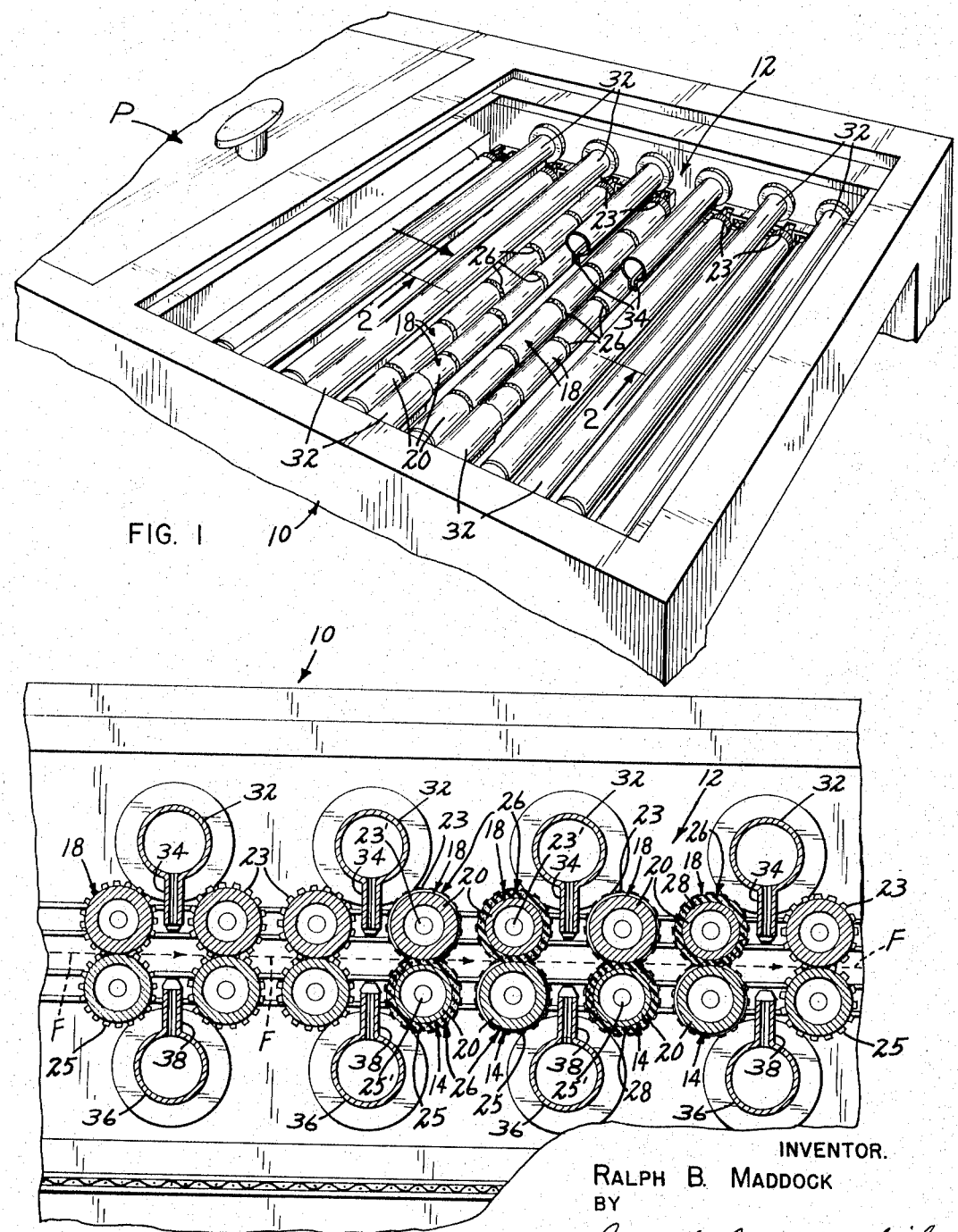

United States Patent Office 3,363,816
Patented Jan. 16, 1968

3,363,816
ROLLER CONSTRUCTION FOR STRIPPING SHEET MATERIAL FROM TRANSPORT ROLLERS
Ralph B. Maddock, Minneapolis, Minn., assignor to Pako Corporation, Minneapolis, Minn.
Continuation of application Ser. No. 277,361, May 1, 1963. This application Feb. 5, 1965, Ser. No. 432,073
3 Claims. (Cl. 226—186)

This application is a continuation of application Ser. No. 277,361, filed May 1, 1963.

The invention relates broadly to photographic film processing equipment and more particularly to the rollers in drying equipment. In this type of equipment the film is transported by passing the same between two rollers. There has been both a need and a demand for rapid film processing systems which offer substantial savings in labor and material. Rapid processing is more acute in medical work, as in hospitals, where it is desirable to process X-ray pictures so that diagnosis can be made quickly, even during an operation. In the lithographic arts and photographic news media rapid processing is needed to insure quick dispatch of photographs.

Thin film processors capable of satisfying the above demands for high processing rates are now commercially available. However, with the advent of rapid film speeds between rollers there is the problem of the inherent tendency of the film material to stick on the rollers after leaving the point of contact of the rollers in transport systems commonly used in conveying the film through the various chemical and drier sections of the film processors. The slightest adherence of the film material to a roller may cause the film to bulge or diverge from its prescribed path which may necessitate stoppage of the apparatus for removal of the film from between or around the rollers. Not only is there down-time on the machine, but damage may result to the film. This invention is directed to eliminating the foregoing problems as well as others.

It is therefore an object of this invention to provide a roller transport assembly which will eliminate the adherence or sticking of film material to the rollers conveying the same. It is a further object to provide a roller transport system which can be manufactured simply and inexpensively yet which in operation provides means for transporting thin film reliably and effectively.

It is an additional object to provide a roller transport which may be easily placed in the area of transport where the most difficulty is found with regard to film adherence to the rollers. Such an area differs due to different film emulsions and types of film. A still further object is to provide a roller construction for controlling the progression of film to and from rollers which is self-contained and easily installed or removed.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of examples preferred embodiments of the inventive idea wherein like numerals refer to like parts throughout.

In the drawings forming part of this application:

FIGURE 1 is a perspective view of the roller transport portion of the dryer section of a film processing machine with portions of the drying tubes broken away.

FIGURE 2 is a longitudinal section on the line 2—2 of FIGURE 1.

FIGURE 3 is a perspective view of a pair of transport rollers embodying the invention and removed from the dryer section portions thereof being broken away.

FIGURE 4 is an enlarged fragmentary section on the line 4—4 of FIGURE 3.

FIGURE 5 is an enlarged section on the line 5—5 of FIGURE 3.

FIGURE 6 is a sectional view on the line 6—6 of FIGURE 4.

FIGURE 7 is a perspective view of the ring member removed from the roller.

FIGURE 8 is a perspective view of a portion of a transport roller illustrating a further embodiment of the invention.

Referring to the drawings in detail, the roller construction is described in conjunction with the drier section 10 of a photographic film processor although it is understood that it is in no way limited thereto. The remaining sections of the photographic film processor are not illustrated but include a series of processing tanks for developing, fixing and washing the film material prior to entrance into the drier.

The drier 10 includes the roller transport unit 12 which includes, in part, a series of lower rollers 14 in conjunction with oppositely disposed upper rollers 18. The upper rollers maintain separable contact with the lower rollers by means of gravity. A progression of spaced pairs of rollers such as 14 and 18 are provided which are cooperatively disposed to provide a continuous path therebetween for the film material throughout the drying operation.

Each of the pair of rollers 14 and 18 comprises a body portion 20 having a cylindrical peripheral surface. The cylindrical body 20 is composed of material providing a hard durable surface, the body 20 being secured to a center shaft 22.

The shaft 22 has formed on one end of the gear 21 which engages a worm gear of the transmission system not shown. On the opposite end of the shaft 22 is the transfer gear 23 which engages the gear 25 to thereby drive the roller 14.

The roller 18 is formed with the trunnion 23' which mounts in a bearing in the section 10. The roller 14 is formed with the trunnion 25' and the trunnion 27' which mount in bearings (not shown) in the section 10.

The upper roller 18 has formed on the outer surface thereof one or more of the annular recesses 24 which receive therein the ring 26 which is formed of soft resilient compressible material. The ring 26 may be secured in position by any suitable adhesive to the bottom 28 of the recess 24 or may grippingly engage the same.

The ring 26 is preferably made with a flat outer surface 30 and is composed of a resilient material substantially immune to chemical degradation and readily compressible, yet of sufficient elasticity to quickly flex back to its normal shape the purpose of which will be set forth hereinafter. One material possessing such properties has been found to be polyurethane foam.

The inside diameter of the ring 26, shown as $x$, is substantially the diameter of the bottom 28 of the annular recess 24, and the outside diameter of the ring 26, shown as $y$, is greater than the outside diameter of the roller body whereby a portion of the ring projects annularly beyond the surface of the roller. In other words, the radial thickness of the ring is greater than the depth of the groove 24. The width of the ring 26, shown as $w$, is slightly less than the width of the annular recess 4 whereby the ring is completely free to be compressed into the groove and freely expand and release from the compression thereof.

It will be seen that the cooperating pairs of rollers 14 and 18 are disposed so that upon rotation of the same sheet film material F is transported between the same.

With regard to the pair of rollers 14 and 18 the rings 26 on roller 18 are longitudinally spaced thereon, and the rings 26 on roller 14 are longitudinally spaced thereon; however, the rings on the lower roller 14 are so positioned that they are intermediate the rings 26 on the upper roller 18 or in other words the rings 26 of roller 14 are staggered relative to the rings of roller 18. The rings 26 are positioned in recesses formed in roller 14 identical to the recesses 24 formed in upper roller 18. All other upper and lower rollers employing rings 26 and used in the transport unit are substantially identical to the upper and lower rollers heretofore described. Rollers having rings 26 are not employed in areas of the unit where film adherence is not a problem. In such areas plain surfaced rollers may be used.

The film F, which may be continuous or in sheet form, emerges from the processing section P after it is washed, and is directed, by means not shown, to and between the rollers of the transport unit 12 of the drier 10.

Positioned between some of the upper rollers are the upper warm air supply tubes 32 formed with the downwardly depending louvers 34 which impinge warm air upon the upper surface of the film and dry the same as it is transported opposite the louvers. Similar warm air supply tubes 36 formed with upwardly extended louvers 38 are positioned between some of the lower rollers which impinge warm air upon the under surface of the film sheet as it is transported opposite the louvers.

The film F passes between the pair of rollers in the direction of the arrows. At the point of contact of the rollers such as 18 and 14 the resilient compressible material of the ring 26 compresses to a minimum dimensional thickness which is substantially equal to the depth of recess 24 at the film contact line between the rollers, point R of FIGURES 3 and 4. The ring 26 assumes an eccentric configuration as a result of being compressed along the film contact line between the rollers while the remainder of the ring remains somewhat normal or in an expanded condition. The dimension $a$ represents the thickness of the ring 26 in its expanded condition, FIGURE 6, while the dimension $b$ represents the thickness of the ring 26 at its point of complete compression at roller contact line.

Because of its resilient properties, the natural tendency of the ring 26 is to immediately flex or expand outwardly from its recess in the roller 18 just as it emerges from the line of contact of the two rollers upon the film, the outward radial expansion of the ring indicated by the small arrows at substantially point E as the rollers rotate, FIGURE 4. In some instances, depending upon film emulsion and type of film being processed, the film tends to adhere to the roller 18 and curl upwardly as illustrated by the broken lines in FIGURE 4. However, with the ring 26 flexing or releasing outwardly from the recess 24 of roller 18, the film is actually pushed or released from the roller by the expansion of the ring 26 and thus the film is prohibited from adhering to the roller 18 and going off track.

The rings 26 on the upper roller 18 prevent the film from adhering to the upper roller and curling upwardly as illustrated in broken lines in FIGURE 4, and explained above. The staggered rings 26 on the lower roller 14 expand at substantially point G and prevent the film from adhering to the lower roller and curling downwardly as illustrated in broken lines in FIGURE 5. The rings 26, in short, perform a stripping action upon the film.

Although the staggered arrangement of the rings 26 on the rollers of each pair has proved to be very efficient, other arrangement employing any number of resilient rings may be utilized depending upon the particular application. It has been possible with roller construction herein described to efficiently process film material of a thickness less than .0035 inch with little or no sticking to the transport rollers. Further advantages of the invention were found to reside in the ability of the roller assembly to transport the film whereby marking or scratching of the film surface is eliminated. With the roller construction disclosed, film is transported without adherence or sticking to either upper or lower transport rollers sufficiently so that the film is not deflected from its prescribed path.

A further advantage is derived from the stripping action performed by the roller construction and that is that the rollers having the rings thereon may be easily placed in the unit at the area or areas where certain film, depending upon emulsion or type of film, has a greater tendency to adhere to and follow the roller. In areas where film adherence to the rollers is absent, plain surface rollers may be used.

In FIGURE 8 is illustrated a further embodiment of the invention wherein is shown the transport roller 42 which has formed in the surface thereof the elongated recess 44 extending throughout the length of the roller in a helical formation and in which the elongated resilient compressible member 46 is secured. The thickness of the member 46 is greater than the depth of the recess 44 whereby a portion of the member 46 throughout its length projects beyond the surface of the roller 42. The width of the compressible member 46 is slightly less than the width of the recess 44 whereby the member is completely free to be compressed into the groove and freely expand and release from the compression thereof. The stripping action of the member 46 upon the film is in the manner heretofore described.

The roller 42 may be equipped with a second elongated recess 48 extending throughout the length of the roller in a reverse helical formation bisecting, in effect, the recess 44. Positioned in the recess 48 is the elongated resilient compressible member 50 identical to the member 46. The recess 48 and the member 50 are of the same construction as recess 44 and member 46.

The invention is not to be understood as restricted to the details set forth since these may be modified within the scope of the appended claims without departing from the spirit and scope of the invention.

Having thus described the invention, what is claimed as new and desired to be secured by Letters Patent is:

1. In a roller assembly for transporting sheet film having means for stripping the sheet film from a roller, the improvement in said stripping means, said improvement including,
   (a) a first cylindrical roller,
   (b) a second cylindrical roller for rolling contact with said first roller,
   (c) a ring member having a constant diameter composed of compressible resilient material,
   (d) said first roller having an annular recess extending radially into the roller from the outer surface of the roller and in which said ring is mounted,
   (e) the inner diameter of said ring being substantially the diameter of the bottom of said recess whereby the ring is maintained in the recess,
   (f) said recess having a width greater than the width of said ring in an uncompressed state whereby the recess will accommodate said ring in a compressed state,
   (g) the radial thickness of said ring member being greater than the depth of said recess when said ring is in an uncompressed state and no greater than the depth of said recess when in a compressed state whereby an annular portion of said ring extends outwardly of the surface of said roller in its uncompressed state and compresses at the point of contact of said ring with said second roller rotated in contact with said first roller,
   (h) said ring expanding to its original uncompressed thickness at a point advanced from said point of roller contact to thereby strip sheet material from said first roller mounting said ring member.

2. In a roller assembly for transporting sheet film having means for stripping the sheet film from the roller; the improvement in said stripping means, said improvement including,
(a) a first cylindrical roller having
(b) at least one annular recess extending radially into the roller from the outer surface of the roller,
(c) a ring member composed of soft resilient compressible material positioned in said annular recess,
(d) the radial thickness of said ring member being greater than the depth of said annular recess whereby an annular portion of said ring extends outwardly of the surface of said roller when in an uncompressed state,
(e) a second cylindrical roller and ring identical to said first roller and ring,
(f) said rings of said rollers being offset one from the other,
(g) means for mounting said rollers with the longitudinal axis of each in the same plane and in rolling contact whereby said rings compress at the point of contact with a roller and expand beyond said point of contact to thereby prevent sheet material transported between said rollers from adhering to either of said rollers.

3. A roller and sheet stripping means comprising:
(a) a cylindrical roller having
(b) at least one recess extending radially into the roller from the outer surface of the roller,
(c) a resilient compressible member positioned in said recess,
(d) said recess having a width greater than the width of said compressible member in an uncompressed state whereby the recess will accommodate said compressible member in a compressed state,
(e) the radial thickness of said resilient compressible member being greater than the depth of said recess whereby a portion of said resilient member extends beyond the surface of said roller and is compressed at the point of contact with a second roller,
(f) said resilient member expanding to its original thickness at a point beyond said point of roller contact to thereby strip sheet material adhering to said roller.

References Cited
UNITED STATES PATENTS

| | | | |
|---|---|---|---|
| 1,437,843 | 12/1922 | Heinricks | 271—51 |
| 1,830,120 | 11/1931 | McGowan | 271—51 |
| 3,042,397 | 7/1962 | Tarbuck | 271—51 |
| 3,120,794 | 2/1964 | Gold | 271—51 X |

EDWARD A. SROKA, *Primary Examiner.*

EVON C. BLUNK, *Examiner.*

A. C. HODGSON, *Assistant Examiner.*